(12) United States Patent
Kim et al.

(10) Patent No.: US 11,410,583 B2
(45) Date of Patent: Aug. 9, 2022

(54) ELECTRONIC DEVICE AND METHOD FOR DISPLAYING IMAGE ON FLEXIBLE DISPLAY

(71) Applicant: Samsung Electronics Co., Ltd., Suwon-si (KR)

(72) Inventors: Raetae Kim, Suwon-si (KR); Wankyu Kim, Suwon-si (KR); Yongjin Kwon, Suwon-si (KR); Jookwan Lee, Suwon-si (KR); Youngmin Ji, Suwon-si (KR); Soyoung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/326,213

(22) Filed: May 20, 2021

(65) Prior Publication Data
US 2022/0139282 A1    May 5, 2022

(30) Foreign Application Priority Data

Nov. 5, 2020 (KR) .......................... 10-2020-0147066

(51) Int. Cl.
G09G 3/00 (2006.01)
G06F 1/16 (2006.01)

(52) U.S. Cl.
CPC .......... *G09G 3/035* (2020.08); *G06F 1/1686* (2013.01); *G09G 2340/0442* (2013.01); *G09G 2380/02* (2013.01)

(58) Field of Classification Search
CPC .......... G09G 3/035; G09G 2340/0442; G09G 2380/02; G06F 1/1686; G06F 1/1652;
(Continued)

(56) References Cited

U.S. PATENT DOCUMENTS 8,593,555 B1 * 11/2013 Chun ................... H04N 1/3873
348/333.01
10,452,156 B2    10/2019 Kang et al.
(Continued)

FOREIGN PATENT DOCUMENTS

KR    10-2014-0107888 A    9/2014
KR    10-2016-0004132 A    1/2016
(Continued)

OTHER PUBLICATIONS

Notice of Patent Grant dated May 6, 2021 in connection with Korean Patent Application No. 10-2020-0147066, 7 pages.
(Continued)

*Primary Examiner* — Temesghen Ghebretinsae
*Assistant Examiner* — Ivelisse Martinez Quiles

(57) ABSTRACT

An electronic device includes a housing, a flexible display, a camera, and a processor. The housing includes a first housing and a second housing coupled to and movable with respect to the first housing. The flexible display including an exposed area that is a first size when the electronic device is in a first state and a second size when the second housing moves and the electronic device is switched into a second state. The processor is configured to acquire an image having a designated aspect ratio through the camera. The processor is also configured to display a first area of the image on the exposed area corresponding to the first size when the electronic device is in the first state and display a second area of the image on the exposed area corresponding to the second size when the electronic device is in the second state.

13 Claims, 13 Drawing Sheets

(58) Field of Classification Search
CPC ............ G06F 1/1677; H04N 5/23238; H04M 1/0264; H04M 1/0268; G06T 2207/20221
See application file for complete search history.

(56) References Cited

U.S. PATENT DOCUMENTS

| | | |
|---|---|---|
| 10,990,208 B2 | 4/2021 | Jung et al. |
| 2014/0240576 A1 | 8/2014 | Chun et al. |
| 2016/0044148 A1* | 2/2016 | Pizzo ................. H04M 1/0264 455/575.8 |
| 2017/0011714 A1* | 1/2017 | Eim ..................... G06F 1/1677 |
| 2017/0347035 A1* | 11/2017 | Kim .................. H04N 5/23296 |
| 2019/0261519 A1 | 8/2019 | Park et al. |

FOREIGN PATENT DOCUMENTS

| | | |
|---|---|---|
| KR | 10-2017-0038308 A | 4/2017 |
| KR | 10-2017-0062121 A | 6/2017 |
| KR | 10-2018-0014616 A | 2/2018 |
| KR | 10-2019-0101184 A | 8/2019 |
| KR | 10-2019-0128843 A | 11/2019 |

OTHER PUBLICATIONS

Notice of Preliminary Rejection dated Jan. 20, 2021 in connection with Korean Patent Application No. 10-2020-0147066, 14 pages.
International Search Report dated Aug. 25, 2021 in connection with International Patent Application No. PCT/KR2021/005951, 3 pages.
Written Opinion dated Aug. 25, 2021 in connection with International Patent Application No. PCT/KR2021/005951, 3 pages.

\* cited by examiner

ELECTRONIC DEVICE AND METHOD FOR DISPLAYING IMAGE ON FLEXIBLE DISPLAY

CROSS-REFERENCE TO RELATED APPLICATION

This application is based on and claims priority under 35 U.S.C. 119 to Korean Patent Application No. 10-2020-0147066 filed on Nov. 5, 2020 in the Korean Intellectual Property Office, the disclosure of which is herein incorporated by reference in its entirety.

BACKGROUND

1. Field

Various embodiments of the disclosure relate to a technology for displaying an image according to a degree of expansion of a flexible display.

2. Description of Related Art

Recently, as the processing performance of electronic devices such as smartphones is improved dramatically, a large-area display is preferred in order to effectively provide various functions. At the same time, there is still a demand for miniaturization of electronic devices in order to improve portability.

In response to these demands, an electronic device employing a rollable or slidable display is capable of providing a wide screen as well as improving portability. An electronic device employing a rollable or slidable display is capable of ensuring portability when the display is partially rolled into the inside of the electronic device and thus the display is contracted, and is capable of providing a wide screen when the display is expanded.

The above information is presented as background information only to assist with an understanding of the disclosure. No determination has been made, and no assertion is made, as to whether any of the above might be applicable as prior art with regard to the disclosure.

SUMMARY

In an electronic device employing a rollable or slidable display, the screen aspect ratio of the display may be changed before and after the expansion of the display. Therefore, when an image displayed on the display before expansion is enlarged according to the expansion of the display, the quality of the image may be deteriorated. In addition, when an image is displayed on the display in the same aspect ratio before and after the expansion of the same, a letterbox may occur on the display, and screen utilization rate may be degraded.

Various embodiments disclosed herein are capable of displaying an image in an electronic device adopting a rollable or slidable display without deteriorating the quality of an image before and after expansion of the display.

An electronic device according to an embodiment disclosed herein may include: a housing including a first housing and a second housing coupled to the first housing to be movable with respect to the first housing; a memory disposed within the housing; a flexible display including an exposed area visible to the outside of the electronic device through a front surface of the electronic device, wherein the exposed area has a first size when the electronic device is in a first state and a second size larger than the first size when the second housing moves and the electronic device is switched into a second state; a camera exposed through an area of the housing; and at least one processor disposed in the housing and electrically connected to the memory, the flexible display, and the camera. The at least one processor may be configured to: acquire an image having a designated aspect ratio through the camera; store, in response to receiving an imaging command from a user, each of a first area of the image corresponding to the first size and a second area of the image corresponding to the second size or an area other than the first area in the second area in the memory; display the first area of the image on the exposed area of the flexible display when the electronic device is in the first state; and display the second area of the image on the exposed area of the flexible display, or merge the first area and the area other than the first area in the second area and display an area obtained thereby on the exposed area of the flexible display when the electronic device is in the second state.

According to an embodiment disclosed herein, a method of operating an electronic device, in which an exposed area of a flexible display exposed to an outside of the electronic device may have a first size or a second size larger than the first size, may include: an operation of acquiring an image having a designated aspect ratio using a camera of the electronic device; an operation of storing, in response to receiving an imaging command from a user, each of a first area of the image corresponding to the first size and a second area of the image corresponding to the second size or an area other than the first area in the second area in the memory; an operation of displaying, by a processor of the electronic device, the first area of the image on the exposed area of the flexible display when the size of the exposed area is the first size; and an operation of displaying, by the processor, the second area of the image on the exposed area of the flexible display, or merging, by the processor, the first area and the area other than the first area in the second area and displaying an area obtained thereby on the exposed area of the flexible display when the size of the exposed area is the second size.

According to various embodiments disclosed herein, it is possible to display an image in an electronic device adopting a rollable or slidable display without deteriorating quality of the image even if the screen aspect ratio of the display is changed before and after expansion of the display. In addition, because a letterbox does not occur on the display, it is possible to increase a screen use rate.

The effects capable of being obtained by various embodiments disclosed herein are not limited to those described above, and other effects, which are not described above, can be clearly understood by a person ordinarily skilled in the technical field, to which the disclosure belongs.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1A through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1A:
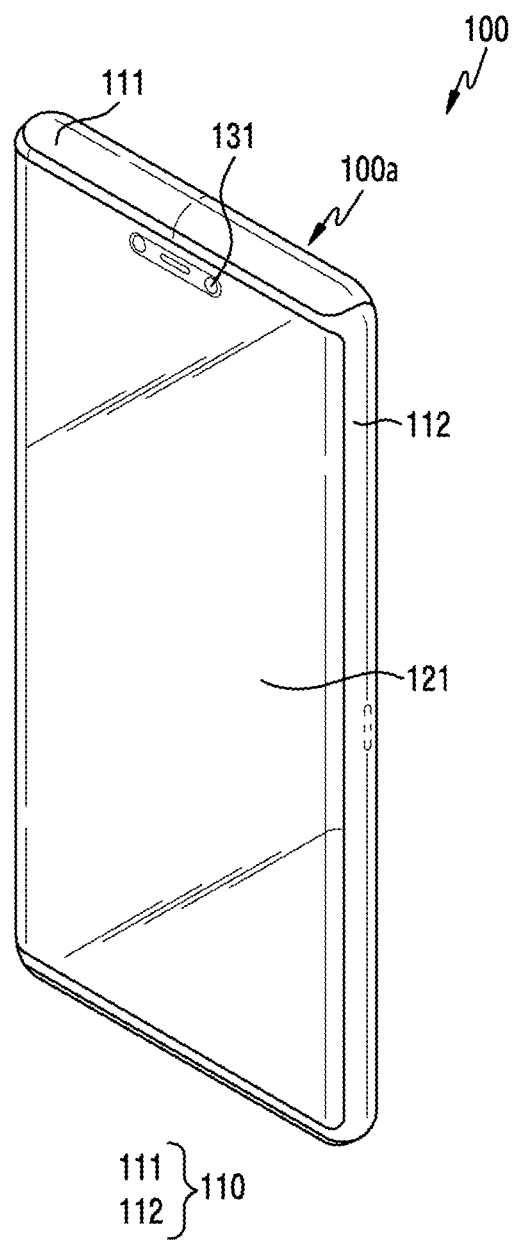
FIG. 1A illustrates a perspective view of an electronic device in a first state according to an embodiment.
Figure 1B:
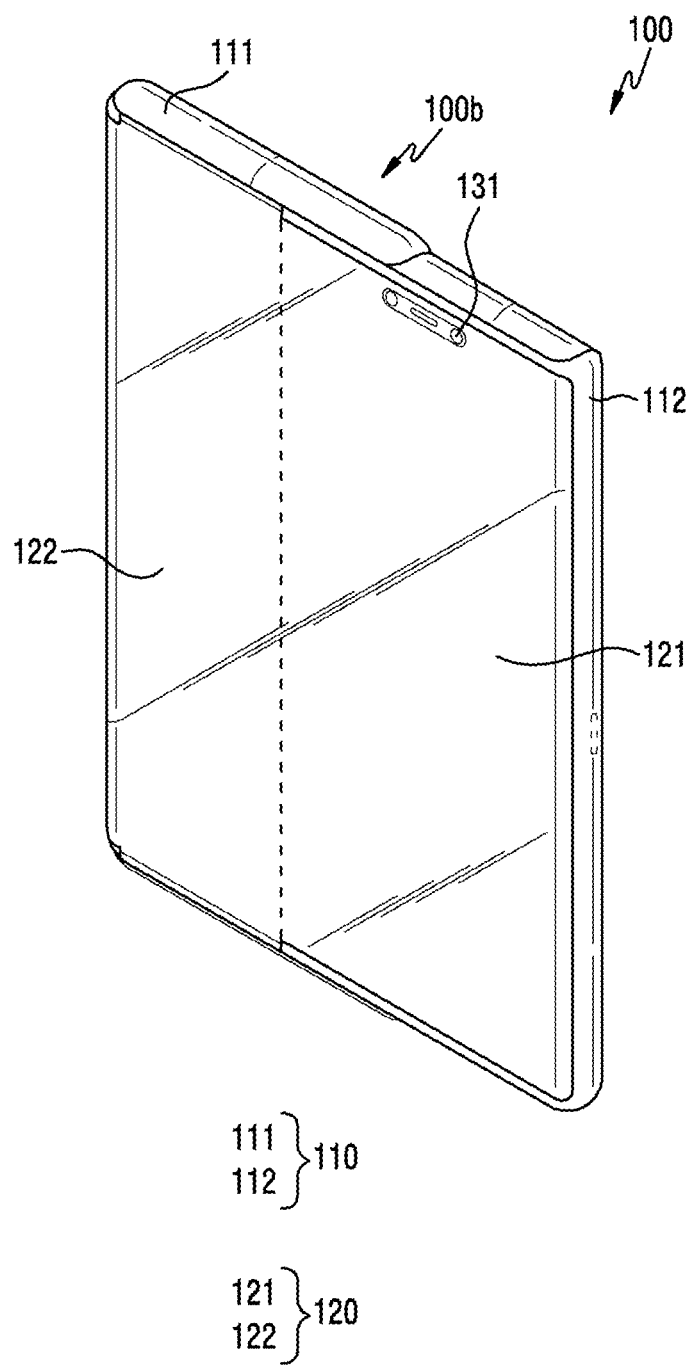
FIG. 1B illustrates a perspective view of the electronic device in a second state according to an embodiment.
Figure 1C:
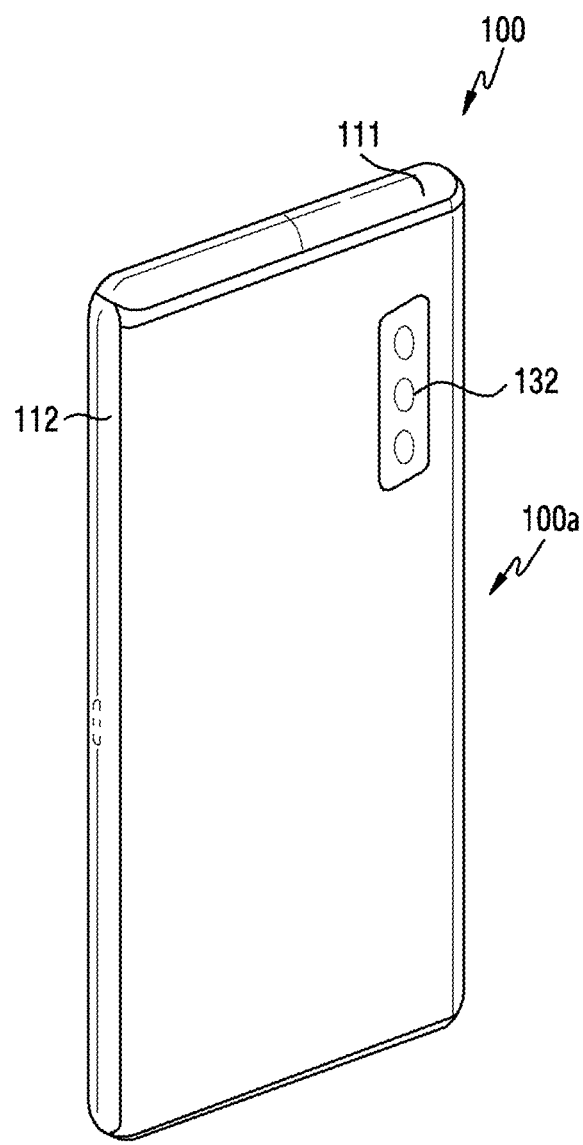
FIG. 1C illustrates a perspective view of the rear surface of the electronic device in the first state according to an embodiment.

FIG. 1A illustrates a perspective view of an electronic device 100 in a first state 100a according to an embodiment. FIG. 1B illustrates a perspective view of the electronic device 100 in a second state 100b according to an embodiment. FIG. 1C illustrates a perspective view of a rear surface of the electronic device 100 in the first state 100a according to an embodiment.

Referring to FIGS. 1A to 1C, a display 120 may be placed on one surface of the electronic device 100 according to an embodiment. Hereinafter, the surface on which the display 120 is placed is referred to as a "front surface". According to an embodiment, the display 120 may occupy most of the front surface of the electronic device 100. According to an embodiment, the display 120 may have a flat shape and a curved shape. On the front surface of the electronic device 100, the display 120 and a housing 110 surrounding at least a portion of the edge of the display 120 may be disposed. According to an embodiment, the housing 110 may define a partial area of the front surface, the side surface, and the rear surface of the electronic device 100. According to another embodiment, the housing 110 may define a partial area of the side surface and the rear surface of the electronic device 100. According to an embodiment, the housing 110 may include a first housing 111 and a second housing 112 capable of moving (e.g., moving to the right) with respect to the first housing 111.

According to an embodiment, the display 120 may include a first portion 121 that is capable of being coupled to the second housing 112 and a second portion 122 that is capable of extending from the first portion 121 to one side (e.g., the left) and capable of being retracted into the inside of the electronic device 100. According to an embodiment, when the electronic device 100 is switched from a first state 100a to a second state 100b according to the movement of the second housing 112, the second portion 122 of the display 120 is capable of being drawn out from the inside to the outside of the electronic device 100. According to an embodiment, when the electronic device 100 is switched from the second state 100b to the first state 100a according to the movement of the second housing 112, the second portion 122 of the display 120 is capable of being retracted into the inside of the electronic device 100.

According to an embodiment, a portion of the display 120 that is visible to the outside of the electronic device 100 may be referred to as an exposed area. For example, the electronic device 100 may display a screen through the exposed area. In the first state 100a of the electronic device 100, the size of the exposed area may be a first size that corresponds to the size of the first portion 121 of the display 120, and the size of the exposed area in the second state 100b may be a second size that corresponds to the sum of sizes of the first portion 121 and the second portion 122 of the display 120. The second size may be larger than the first size. For example, when the electronic device 100 is switched from the first state 100a to the second state 100b, the exposed area of the display 120 may be expanded to one side (e.g., the left).

According to an embodiment, when the electronic device 100 is in a third state between the first state 100a and the second state 100b, a portion of the second portion 122 of the display 120 may be drawn out to the outside, and the remaining portion may be retracted into the electronic device 100. When the electronic device 100 is in the third state, the size of the exposed area may be a third size that is larger than the first size and smaller than the second size.

According to an embodiment, a front camera 131 may be included on the front surface of the electronic device 100. According to an embodiment, a rear camera 132 may be included on the rear surface of the electronic device 100. The electronic device 100 may include one or more front cameras 131 and/or one or more rear cameras 132. For example, the electronic device 100 may include three rear cameras, such as a first rear camera, a second rear camera, and a third rear camera. In an embodiment, the first rear camera, the second rear camera, and the third rear camera may be of the same type having the same specifications (e.g., pixels), but the first rear camera and the second rear camera may be implemented as cameras having different specifications. The electronic device 100 may support a function related to a dual camera (e.g., 3D imaging or auto-focusing) through the three rear cameras.

According to an embodiment, the electronic device 100 may include a hinge (not illustrated) that allows at least a portion of the display 120 to be retracted into the inside of the first housing 111 when the electronic device 100 is switched from the second state 100b to the first state 100a. The second portion 122 of the display 120 may be retracted into or drawn out from the electronic device 100 according to the rotation of the hinge.

Hereinafter, description is made with reference to the electronic device 100 illustrated in FIGS. 1A and 1B, but this is merely for convenience of description. A person ordinarily skilled in the art will clearly understand that the disclosure is applicable to a case in which the exposed area is expanded in various forms. For example, the disclosure is applicable to a case in which the second housing 112 is movable to the left with respect to the first housing 111 or a case in which the second housing 112 is movable upward or downward with respect to the first housing 111. As another example, the electronic device may include a first portion (not illustrated) that is capable of being coupled to the first housing 111 and a second portion (not illustrated) capable of being expanded to one side (e.g., the right) from the first portion and capable of being retracted into the inside of the electronic device when the second housing 112 moves (e.g., moving to the right). When the electronic device is in the first state, the second portion may be retracted into the inside of the electronic device to be located adjacent to the second housing 112. When the second housing 112 moves with respect to the first housing 111, the second portion may be drawn out from the inside of the second housing 112. The disclosure is also applicable to the electronic device described above. As another example, the disclosure is also applicable to a foldable electronic device in addition to a rollable (or slidable) electronic device 100 in which the display 120 is capable of being expanded. In a foldable electronic device, a folded state may be understood as a first state, and an unfolded state may be understood as a second state.

Figure 2:
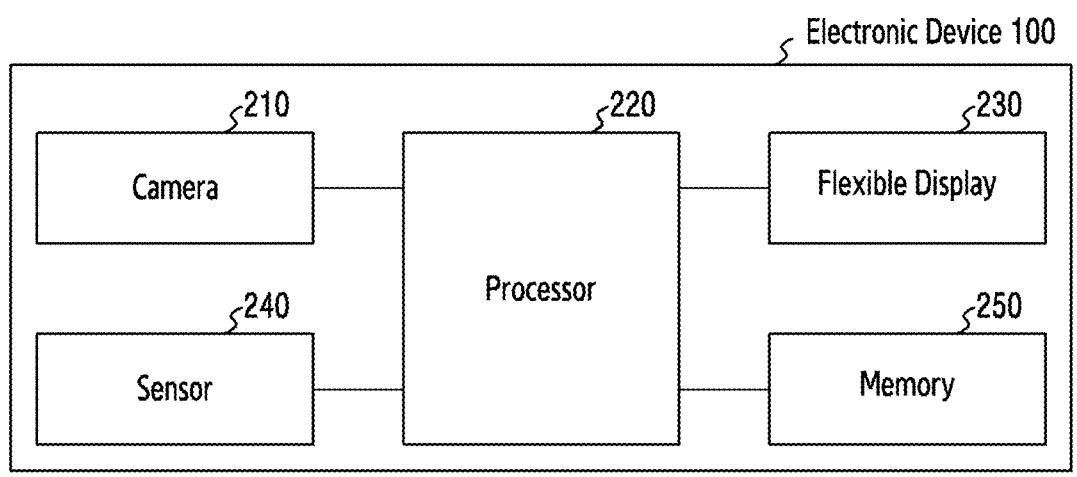
FIG. 2 illustrates a block diagram of an electronic device according to an embodiment.

FIG. 2 illustrates a block diagram of components of an electronic device 100 according to an embodiment.

Referring to FIG. 2, in an embodiment, the electronic device 100 may include a camera 210, a processor 220, a flexible display 230, a sensor 240, and a memory 250. The camera 210 may be understood as a front camera 131 placed on the front surface of the electronic device 100 or a rear camera 132 placed on the rear surface of the electronic device 100. The flexible display 230 may be understood as the display 120 illustrated in FIGS. 1A and 1B.

According to an embodiment, the processor 220 may acquire an image by controlling the camera 210. The camera 210 may acquire an image at an aspect ratio designated by a user or at an aspect ratio designated by an application. In an embodiment, the designated aspect ratio may correspond to an increased resolution that is capable of being acquired through the camera 210. In another embodiment, the designated aspect ratio may correspond to a resolution smaller than the increased resolution that is capable of being acquired through the camera 210.

According to an embodiment, the processor 220 may be understood to include at least one processor. For example, the processor 220 may include at least one of an application processor (AP), an image signal processor (ISP), and a communication processor (CP). In this respect, the processor 220 may be referred to as at least one processor or one or more processors.

According to an embodiment, the processor 220 may execute/control various functions supported by the electronic device 100. For example, the processor 220 may execute an application and control various kinds of hardware by executing codes written using a programming language stored in the memory 250. For example, the processor 220 may execute an application stored in the memory 250 to support an imaging function. In addition, the processor 220 may execute the camera 210 and may set and support an appropriate imaging mode such that the camera 210 is capable of performing an operation intended by the user.

According to an embodiment, the processor 220 may store an image acquired through the camera 210 in the memory 250 and may display the stored image on the flexible display 230. The processor 220 may determine an image area (e.g., a first area or a second area) to be displayed on the flexible display 230 from among images stored in the memory 250.

According to an embodiment, an execution screen of the application executed by the processor 220 or an image stored in the memory 250 may be displayed on the flexible display 230. In addition, the processor 220 may display an image acquired through the camera 210 as a preview on the flexible display 230 in real time.

According to an embodiment, the flexible display 230 may be implemented integrally with a touch panel. The flexible display 230 may support a touch function, detecting a user's input (e.g., touch using a finger) and transmitting the same to the processor 220. The flexible display 230 may be connected to a display driver integrated circuit (DDIC) for driving the flexible display 230, and the touch panel may be connected to a touch IC that detects touch coordinates and processes touch-related algorithms. In an embodiment, the display driver integrated circuit and the touch IC may be integrally formed. In another embodiment, the display driver integrated circuit and the touch IC may be formed separately. The display driver integrated circuit and/or the touch IC may be electrically connected to the processor 220.

According to an embodiment, the electronic device 100 may include a sensor 240. The sensor 240 may include a distance sensor that measures the degree of movement of the housing 110. The distance sensor may measure a distance of the second housing 112 to the first housing 111. The distance sensor may include at least one of a time of flight (TOF) sensor, an ultrasonic sensor, and a radio wave sensor. The processor 220 may determine whether the second housing 112 has moved from the first housing 111 and/or a moving distance using the distance sensor.

According to an embodiment, the sensor 240 may include at least one sensor that detects the state of the flexible display 230. For example, the at least one sensor may be configured to generate electric signals that are distinguished from each other when the flexible display 230 is in the first state 100a and the second state 100b. The at least one sensor may be implemented using at least one of a hall sensor and a magnet sensor. The processor 220 may determine whether the second housing 112 has moved from the first housing 111 using the at least one sensor.

According to an embodiment, using the sensor 240, the processor 220 may detect the movement (e.g., rotation) of the hinge and may determine whether the second housing 112 has moved from the first housing 111.

Figure 3:
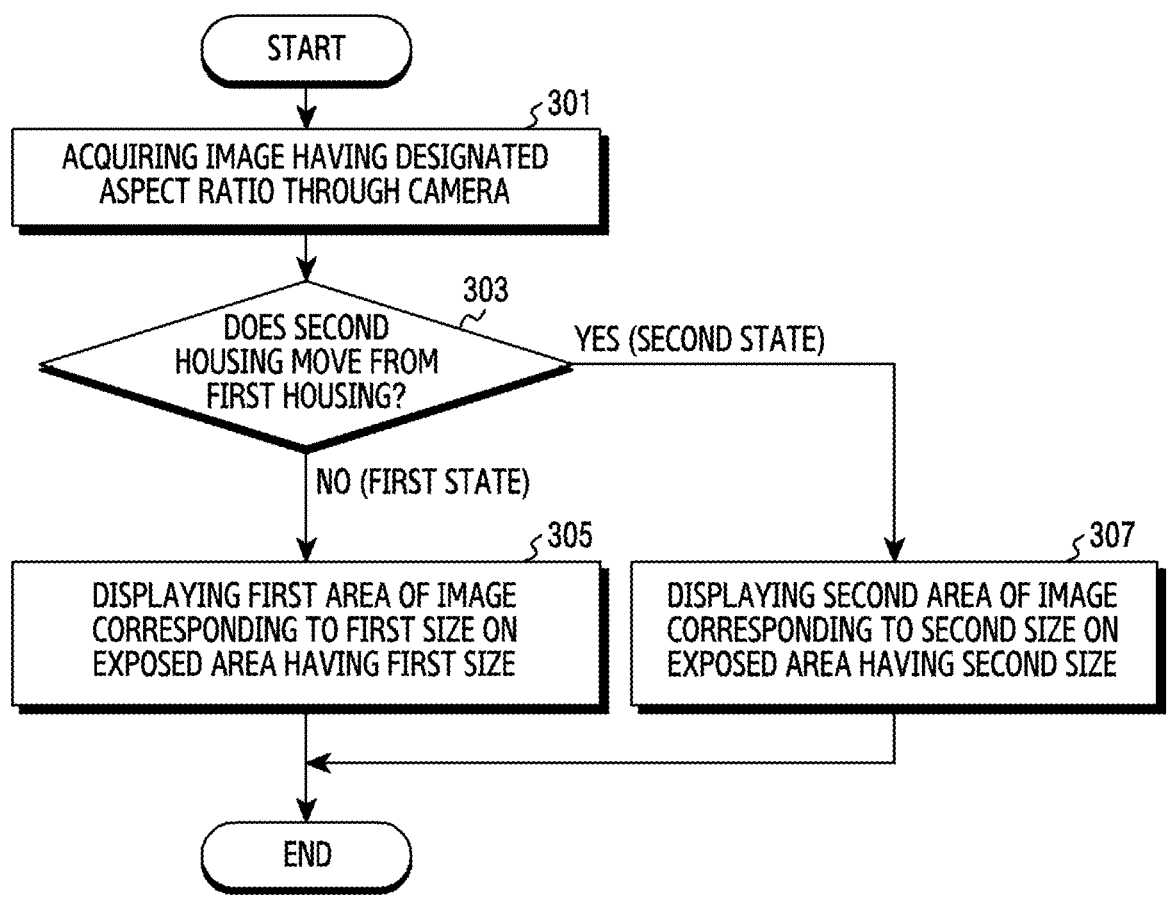
FIG. 3 illustrates a flow chart of a method for displaying an image before and after expansion of the flexible display according to an embodiment.

FIG. 3 illustrates a flow chart of a method for displaying an image before and after expansion of the flexible display 230 according to an embodiment.

According to an embodiment, in operation 301, the processor 220 may acquire an image having a designated aspect ratio through the camera 210. The designated aspect ratio may correspond to the increased resolution that is capable of being obtained through the camera 210.

According to an embodiment, in operation 303, the processor 220 may determine whether the second housing 112 has moved from the first housing 111.

According to an embodiment, the processor 220 may determine whether or not the second housing 112 has moved from the first housing 111 using a sensor 240 (e.g., a sensor that detects the state of the flexible display 230 or a sensor that detects the movement of the hinge).

According to an embodiment, in operation 305, when the second housing 112 has not moved from the first housing 111 (e.g., when the electronic device 100 is in the first state 100a), the processor 220 may display a first area, which corresponds to the first size in an image acquired through the camera 210, on the exposed area (e.g., 121 in FIG. 1A) of the first size of the flexible display 230.

According to an embodiment, in operation 307, when the second housing 112 has moved from the first housing 111 (e.g., when the electronic device 100 is in the second state 100b), the processor 220 may display a second area, which corresponds to the second size in an image acquired through the camera 210, on the exposed area (e.g., 121 and 122 in FIG. 1B) of the second size of the flexible display 230.

According to an embodiment, the second area displayed by the processor 220 on the exposed area of the flexible display 230 may include the first area.

Figure 4:
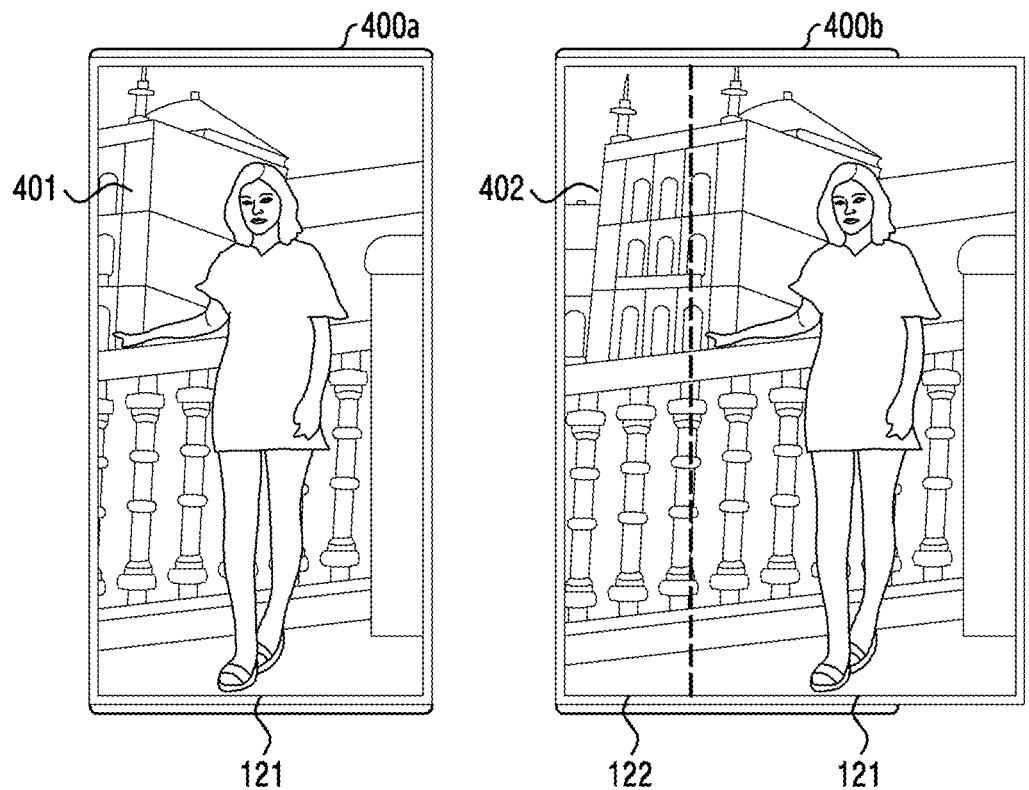
FIG. 4 illustrates an example of displaying an image before and after expansion of the flexible display according to an embodiment.

FIG. 4 illustrates an example of displaying an image before and after expansion of the flexible display 230 according to an embodiment.

According to an embodiment, reference numeral 400a indicates an example of displaying an image on the flexible display 230 when the electronic device 100 is in the first state 100a.

According to an embodiment, when the electronic device 100 is in the first state 100a, the exposed area of the flexible display 230 may have a first size. The first size may be the size of the first portion 121 illustrated in FIG. 1A. The processor 220 may display a first area 401, which corresponds to the first size in an image acquired through the camera 210, on the exposed area of the flexible display 230.

According to an embodiment, the first area 401 of the image acquired through the camera 210 may have the same aspect ratio as the exposed area of the first size, and may be thus displayed to fill the flexible display 230. For example, the aspect ratio of the first area 401 displayed on the exposed area of the first size may be 16:9. In another embodiment, the aspect ratio of the first area 401 may not be the same as the exposed area of the first size, and a letterbox may thus occur in the exposed area of the flexible display 230.

According to an embodiment, reference numeral 400b indicates an example of displaying an image on the flexible display 230 when the electronic device 100 is in the second state 100b.

According to an embodiment, when the electronic device 100 is in the second state 100b, the exposed area of the flexible display 230 may have a second size. The second size may correspond to the sum of the sizes of the first portion 121 and the second portion 122 illustrated in FIG. 1B. The processor 220 may display a second area 402, which corresponds to the second size in an image acquired through the camera 210, on the exposed area of the flexible display 230.

According to an embodiment, the second area 402 of the image acquired through the camera 210 may have the same aspect ratio as the exposed area of the second size, and may be thus displayed to fill the flexible display 230. For example, the aspect ratio of the second area 402 displayed on the exposed area of the second size may be 4:3. In another embodiment, the aspect ratio of the second area 402 may not be the same as the exposed area of the second size, and a letterbox may thus occur in the exposed area of the flexible display 230.

According to an embodiment, the processor 220 may determine the first area 401 and the second area 402 such that the second area 402 includes the first area 401. For example, in the case of an electronic device 100 including a flexible display 230 extending horizontally, the processor 220 may determine the first area 401 and the second area 402 in an image such that the second area 402 and the first area 401 have the same vertical length while the horizontal length of the second area 402 is longer than that of the first area 401.

According to an embodiment, when the electronic device 100 is switched from the first state 100a to the second state 100b and thus the aspect ratio of the exposed area is changed, the processor 220 may change the image displayed on the exposed area of the flexible display 230 from the first area 401 to the second area 402. When the electronic device 100 is switched from the first state 100a to the second state 100b, the image of the first area 401 is not enlarged based on the expansion of the exposed area of the flexible display 230. Thus, it is possible to prevent deterioration of the quality of the displayed image. For example, the processor 220 may additionally display an image corresponding to the second portion 122, which has the size of the exposed area increased as the exposed area is changed from the first size to the second size, on the exposed area.

Figure 5:
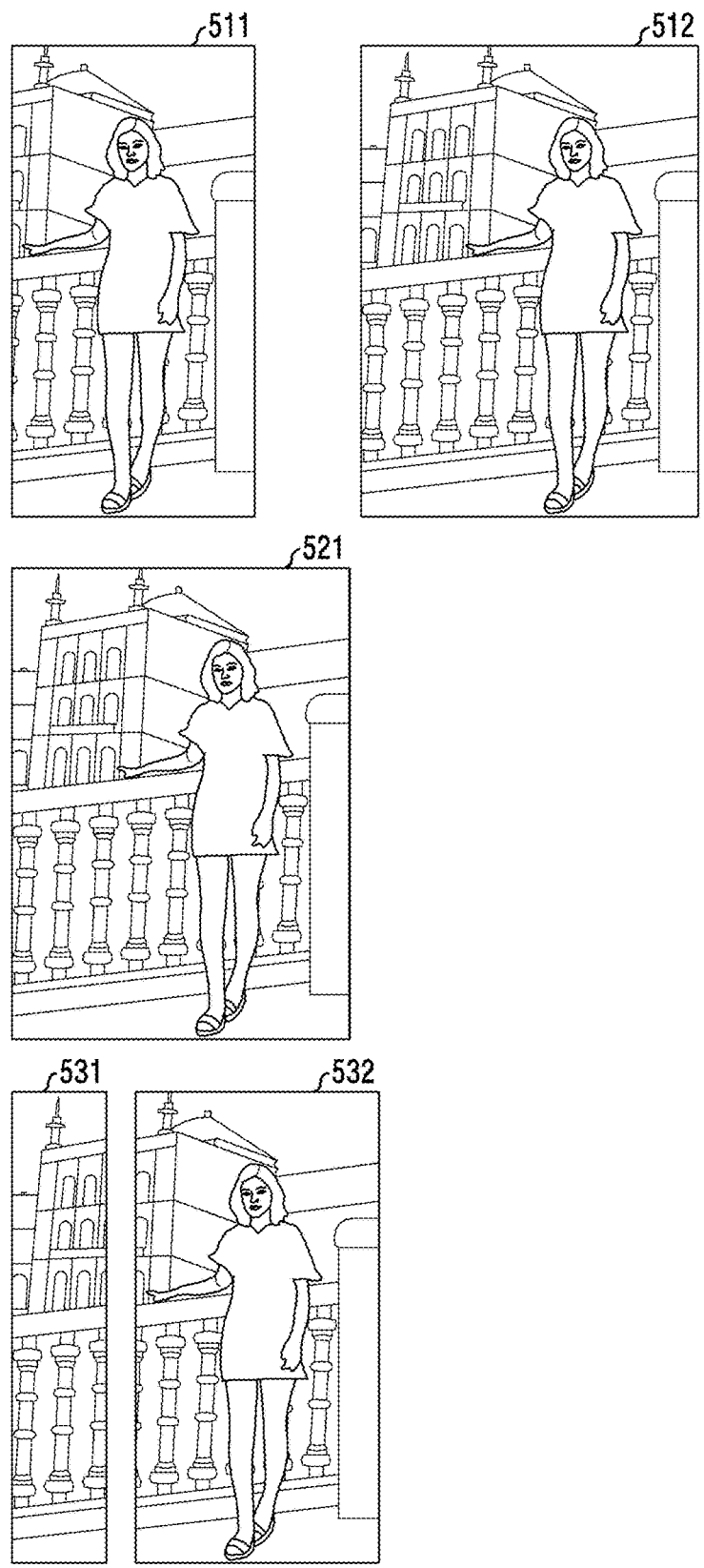
FIG. 5 illustrates examples of images stored in a memory in order to display an image before and after expansion of the flexible display according to an embodiment.

FIG. 5 illustrates examples of images stored in the memory 250 in order to display an image before and after expansion of the flexible display 230 according to an embodiment.

According to an embodiment, the processor 220 may store each of an image of the first area 511 and an image of the second area 512 in the memory 250 among images acquired through the camera 210. For example, the first area 511 may be an image having an aspect ratio of 16:9, and the second area 512 may be an image having an aspect ratio of 4:3.

According to an embodiment, the processor 220 may continuously capture and acquire an image of the first area 511 and an image of the second area 512 through the camera 210 and may store each of the images in the memory 250. According to another embodiment, the processor 220 may acquire an image of the second area 512 through the camera 210, may then crop a portion of the image of the second area 512, and may then store the image of the first area 511 obtained thereby. The processor 220 may store the image of the second area 512 which is not cropped.

According to an embodiment, when the electronic device 100 is in the first state 100a, the processor 220 may display the image of the first area 511 on the exposed area of the first size of the flexible display 230. When the electronic device 100 is in the second state 100b, the processor 220 may display the image of the second area 512 on the exposed area of the second size of the flexible display 230. When the electronic device 100 is switched from the first state 100a to the second state 100b, the processor 220 may replace the image of the first area 511 displayed on the flexible display 230 with the image of the second area 512 and may display the image of the second area 512. When the electronic device 100 is switched from the second state 100b to the first state 100a, the processor 220 may replace the image of the second area 512 displayed on the flexible display 230 with the image of the first area 511 and may display the image of the first area 511.

According to an embodiment, when the processor 220 stores each of the image of the first area 511 and the image of the second area 512 in the memory 250, the user may confirm that two images are separately stored in the electronic device 100. For example, the user may confirm that each of the image of the first area 511 and the image of the second area 512 is stored in "My Files" of the electronic device 100. The electronic device 100 may show the user that the image of the first area 511 and the image of the second area 512 are separate images.

According to an embodiment, when transmitting images to an external electronic device, the electronic device 100 may transmit one image selected by the user among the image of the first area 511 and the image of the second area 512, may receive information on a display aspect ratio of the external electronic device and transmit an image having an aspect ratio corresponding to the display aspect ratio, or may transmit two images (e.g., the image of the first area 511 and the image of the second area 512) to the external electronic device such that the external electronic device may also replaceably display the image of the first area 511 and the second area 512 according to the display aspect ratio thereof.

According to an embodiment, the processor 220 may store the image of the second area 521 in the memory 250 among the images acquired through the camera 210. For example, the second area 521 may be a 4:3 image.

According to an embodiment, the processor 220 may acquire the image of the second area 521 through the camera 210 and then store the image in the memory 250.

According to an embodiment, when the electronic device 100 is in the first state 100a, the processor 220 may crop a portion of the image of the second area 521 and display the image obtained thereby on the exposed area of the first size of the flexible display 230. When the electronic device 100 is in the second state 100b, the processor 220 may display the image of the second area 512 on the exposed area of the second size of the flexible display 230.

According to an embodiment, the processor 220 may store, in the memory 250, each of the image of the first area 532 and a fourth area 531 corresponding to an area other than the first area in the second area among the images acquired through the camera 210. For example, the first area 532 may be a 4:3 image, and the fourth area 531 may be a 16:3 image.

According to an embodiment, the processor 220 may acquire the image of the second area through the camera 210, then crop a portion of the image of the second area, and then store the image of the first area 532. In addition, the processor 220 may separately store the image of the fourth area 531.

According to an embodiment, when the electronic device 100 is in the first state 100a, the processor 220 may display the image of the first area 532 on the exposed area of the first size of the flexible display 230. When the electronic device 100 is in the second state 100b, the processor 220 may display an image obtained by merging the first area 532 and the fourth area 531 on the exposed area of the second size of the flexible display 230.

Figure 6:
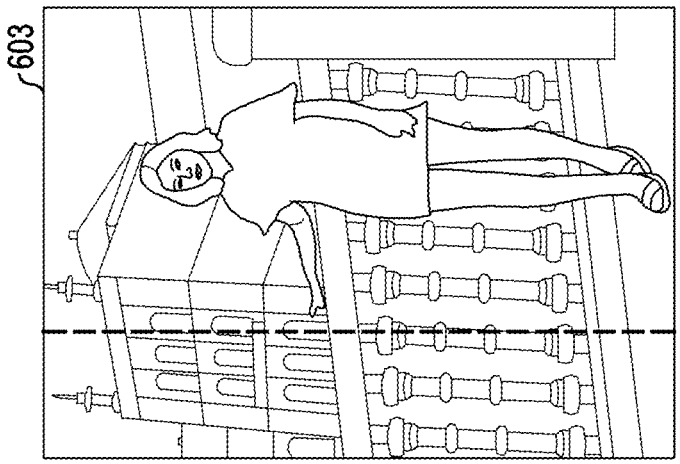
FIG. 6 illustrates an example of displaying an image according to an expansion degree of the flexible display according to an embodiment.
Figure 6:
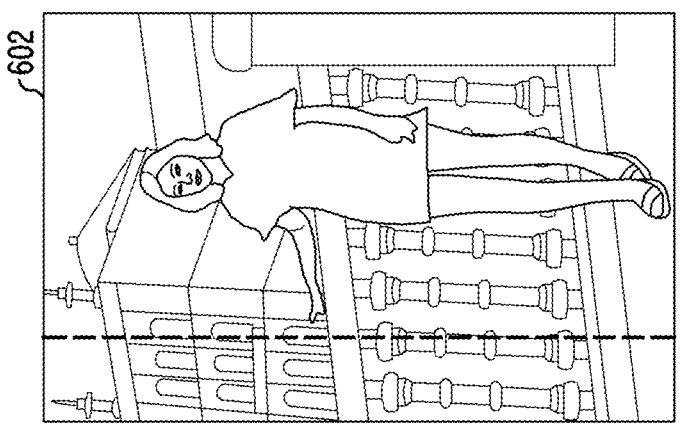
Figure 6:
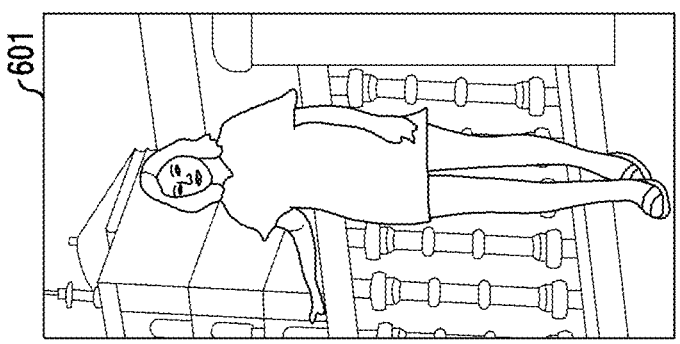

FIG. 6 illustrates an example of displaying an image according to an expansion degree of the flexible display 230 according to an embodiment.

According to an embodiment, an electronic device 100 may include a flexible display 230 having exposed areas having different sizes according to a distance by which the second housing 112 has moved from the first housing 111. The electronic device 100 may have an exposed area having a first size in the first state 100a, and the processor 220 may display an image of a first area 601 on the exposed area having the first size. The electronic device 100 may have an exposed area having a second size in the second state 100b, and the processor 220 may display an image of a second area 603 on the exposed area having the second size.

According to an embodiment, the electronic device 100 may have a third state between the first state 100a and the second state 100b. The exposed area of the flexible display 230 may have a third size when the electronic device 100 is in the third state. In an embodiment, the third state of the electronic device 100 may be understood as a state designated such that the second housing 112 is located at a specific distance from the first housing 111. For example, while the electronic device 100 is switched from the first state 100a to the second state 100b, one or more stop points may be designated in advance, and the user may select a degree of expansion of the flexible display 230 as needed. In another embodiment, the third state of the electronic device 100 may be understood as the state through which the electronic device 100 continuously passes while being switched from the first state 100a to the second state 100b.

According to an embodiment, when the electronic device 100 is in the third state, the processor 220 may display a third area 602, which is larger than the first area and smaller than the second area 603 among the images acquired through the camera 210 on the exposed area of the flexible display 230 so as to correspond to the third state. According to an embodiment, among the images acquired through the camera 210, the processor 220 may store multiple third areas 602, each of which is larger than the first area 601 and smaller than the second area 603, in the memory 250. For example, the multiple third areas 602 may correspond to one or more stop points during switching from the first state 100*a* to the second state 100*b*. The processor 220 may display the images of the multiple third areas 602 stored in the memory 250 on the exposed area of the flexible display 230.

According to an embodiment, the processor 220 may determine that the image of the third area 602 includes the image of the first area 601 and is included in the image of the second area 603.

According to an embodiment, in the case in which each of the images of the first area 511 and the second area 512 has been stored in the memory 250, when the electronic device 100 is in the third state, the processor 220 may display the image of the second area 512 on the flexible display 230. In response to recognizing that the flexible display 230 in the first state 100*a* starts to expand, the electronic device 100 may replace the image of the first area 511 with the image of the second area 512 and display the image of the second area 512 on the flexible display 230. For example, when the electronic device 100 is in the third state, the processor 220 may display the image of the second area 512 on the entire flexible display 230 including a portion of the second portion 122 and the first portion 121 corresponding to the exposed area and the remaining portion of the second portion 122 retracted into the inside of the electronic device 100.

According to an embodiment, in the case in which the image of the second area 521 is stored in the memory 250, when the electronic device 100 is in the third state, the processor 220 may crop the image of the second area 521 according to the size of the exposed area of the flexible display 230 and may display the image obtained thereby on the flexible display 230. When the size of the exposed area is changed, the processor 220 may change the degree of cropping the image of the second area 512, and when the exposed area has the third size, the processor 220 may display the image of the third area 602.

According to an embodiment, in the case in which each of the images of the first area 532 and the fourth area 531 is stored in the memory 250, when the electronic device 100 is in the third state, the processor 220 may merge a portion of the image of the fourth area 531 with the image of the first area 532 according to the size of the exposed area and may display the image obtained thereby on the flexible display 230.

Referring to FIGS. 4 to 6, in an embodiment, the center of the first area of an image acquired through the camera 210 may be located at one side (e.g., the right) with respect to the center of the second area. In another embodiment, the center of the first area and the center of the second area may coincide with each other.

Figure 7:
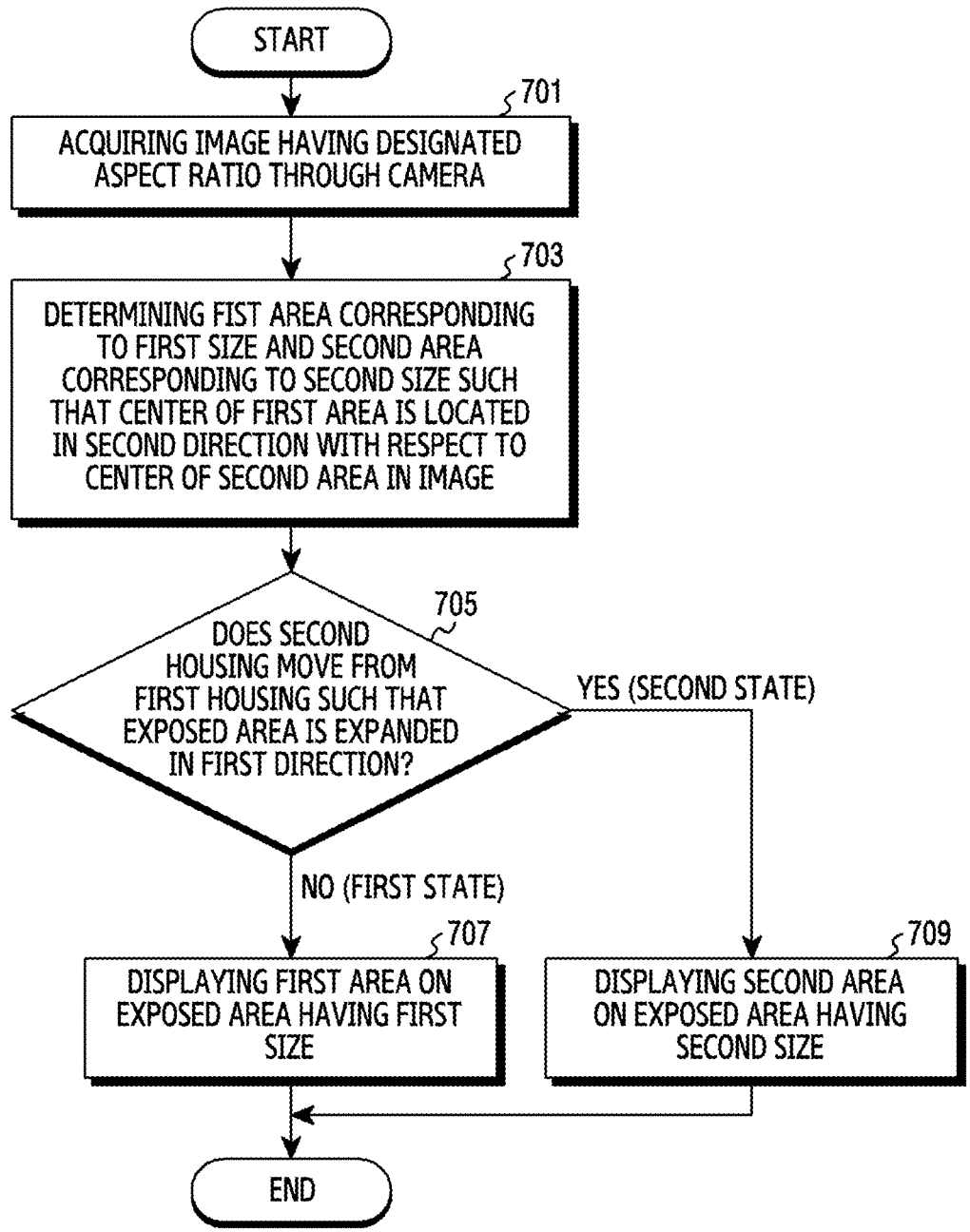
FIG. 7 illustrates a flowchart of a method for determining an image area displayed on the flexible display according to an expansion direction of the flexible display according to an embodiment.

FIG. 7 illustrates a flowchart of a method for determining an image area displayed on the flexible display 230 according to an expansion direction of the flexible display 230 according to an embodiment.

According to an embodiment, in operation 701, the processor 220 may acquire an image having a designated aspect ratio through the camera 210. The designated aspect ratio may correspond to the increased resolution that is capable of being obtained through the camera 210. Operation 701 may correspond to operation 301 illustrated in FIG. 3.

According to an embodiment, in operation 703, the processor 220 may determine a first area and a second area in the acquired image. When the second housing 112 moves with respect to the first housing 111 and thus the exposed area of the flexible display 230 is expanded in a first direction, the processor 220 may determine the first area and the second area such that the center of the first area is located in a second direction that is opposite to the first direction with respect to the center of the second area.

According to an embodiment, when the second housing 112 of the electronic device 100 moves in the second direction with respect to the first housing 111 and thus the exposed area of the flexible display 230 is expanded in the first direction, the processor 220 may determine the first area and the second area such that in the acquired image, the center of the first area is located in the second direction with respect to the center of the second area. In another embodiment, unlike the electronic device 100 illustrated in FIGS. 1A and 1B, even when the second housing 112 moves in the first direction with respect to the first housing 111, and thus the second portion 122 of the flexible display 230, which has been retracted to be close to the second housing 112, is drawn out so that the exposed area is expanded in the first direction, the processor 220 may determine the first area and the second area in the same manner. Hereinafter, a description will be made with reference to the electronic device 100 illustrated in FIGS. 1A and 1B.

According to an embodiment, in operation 705, the processor 220 may determine whether the second housing 112 has moved from the first housing 111. Operation 705 may correspond to operation 303 illustrated in FIG. 3.

According to an embodiment, in operation 707, in the electronic device in the first state 100*a*, the processor 220 may display an image of the determined first area on the exposed area having the first size.

According to an embodiment, in operation 709, in the electronic device 100 in the second state 100*b*, the processor 220 may display an image of the determined second area on the exposed area having the second size.

According to an embodiment, because the first area and the second area are determined in the image using the method described in operation 703, the processor 220 may continuously display the image of the first area, which has been displayed on the flexible display 230 when the electronic device 100 has been in the first state 100*a*, at the same position on the exposed area even when the electronic device 100 is in the second state 100*b*. According to the expansion of the flexible display 230, an image other than the first area is newly displayed on the second portion 122 drawn out to the outside of the electronic device 100, and the image of the first area (or an image corresponding to the image of the first area) is continuously displayed in the first portion 121. Thus, the user may naturally accept the expansion of the flexible display 230.

According to an embodiment, the processor 220 may not display, on the electronic device in the first state 100*a*, an image displayed on the second portion 122 retracted into the inside of the electronic device 100 (e.g., an image other than the first area) due to the contraction of the flexible display 230 in the image of the second area, which has been displayed on the flexible display 230 when the electronic device 100 has been in the second state 100*b*. Because the image of the first area (or an image corresponding to the image of the first area) is continuously displayed in the first portion 121 exposed to the outside regardless of the expansion or contraction of the flexible display 230, the user may naturally accept the expansion of the flexible display 230.

According to an embodiment, when the electronic device 100 is switched from the first state 100*a* to the second state 100*b*, or from the second state 100*b* to the first state 100*a*, the processor 220 may display the same image area at a specific point on the flexible display 230. For example, because the processor 220 may determine a direction opposite to the expansion direction (e.g., the first direction) of the flexible display 230 as the direction in which the center of the image area move (e.g., the second direction), the processor 220 may display the same image area at one point on the flexible display 230. According to an embodiment, when the same image area is displayed at a specific point on the flexible display 230, the electronic device 100 may display the image, which has been originally displayed, in a partial area (e.g., the first portion 121) as it is without displaying a new image on all lines of the flexible display 230 according to the expanded state of the flexible display 230, and may display the new image in the remaining area (e.g., the second portion 122). Accordingly, in the electronic device 100 according to the disclosure, it is possible to reduce the amount of battery consumption for driving the flexible display 230 and to improve power efficiency, which may be advantageous to drive a display driver IC (DDI).

Figure 8:
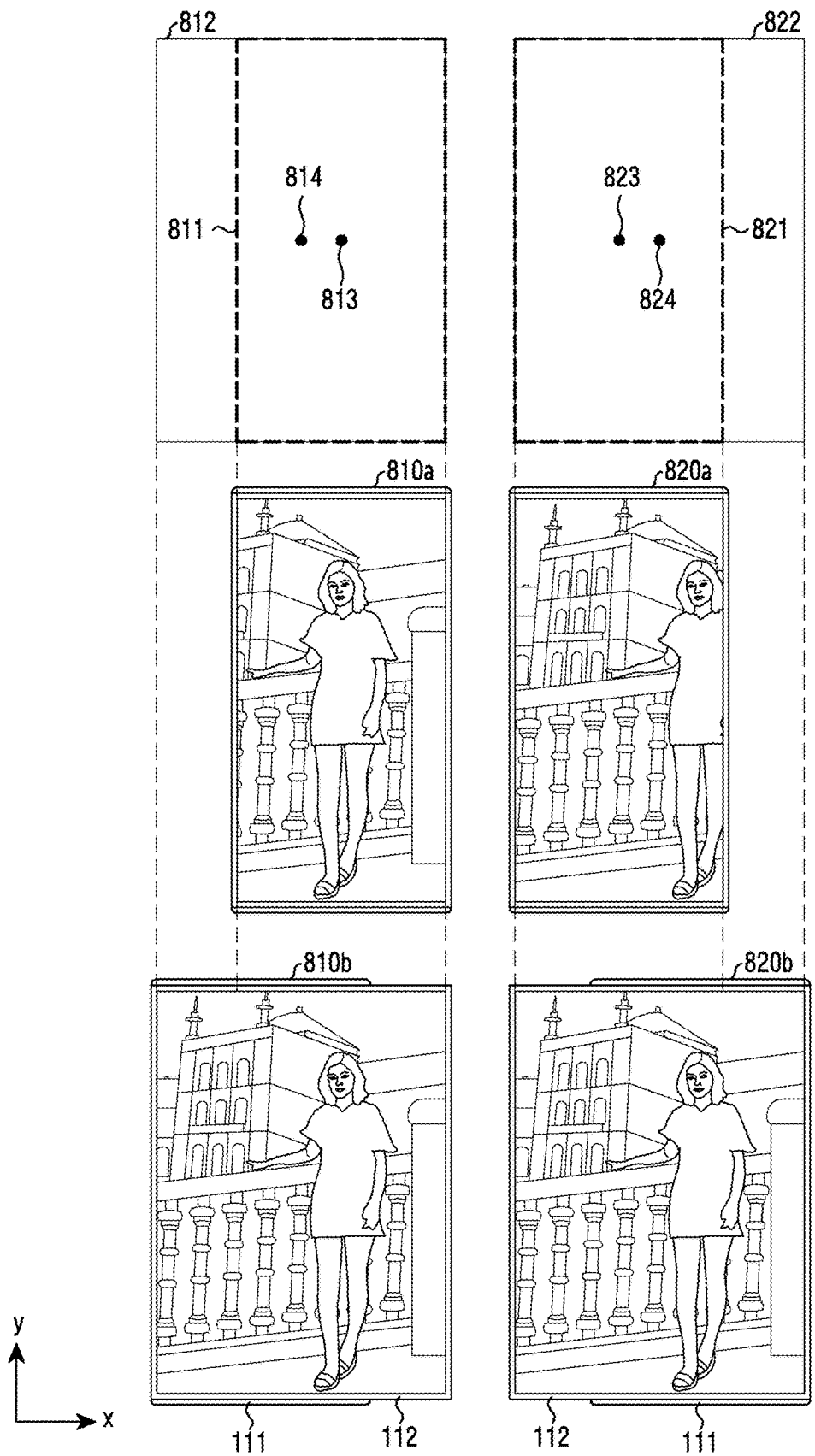
FIG. 8 illustrates examples of image areas displayed on the flexible display according to an expansion direction of the flexible display according to an embodiment.

FIG. 8 illustrates examples of image areas displayed on the flexible display 230 according to an expansion direction of the flexible display 230 according to an embodiment. FIG. 8 illustrates the case where the exposed area of the electronic device 100 is expanded to the left or expanded to the right.

According to an embodiment, reference numeral 810a indicates an example in which an image of a first area 811 is displayed on the electronic device 100 in the first state 100a. Reference numeral 810b indicates an example in which an image of a second area 812 is displayed on the electronic device 100 in the second state 100b. In the electronic device 100, when the second housing 112 moves from the example indicated by reference numeral 810a in the +x direction with respect to the first housing 111, the exposed area of the flexible display 230 may be expanded in the −x direction to the example indicated by reference numeral 810b. With respect to the description made above with reference to FIG. 7, the first direction may be understood as the −x direction, and the second direction may be understood as the +x direction. According to an embodiment, the processor 220 may determine a first area 811 and a second area 812 in an image acquired through the camera 210 such that the center 813 of the first area 811 is located in the second direction (e.g., the +x direction) with respect to the center 814 of the second area 812.

According to an embodiment, reference numeral 820a indicates an example in which the image of a first area 821 is displayed on the electronic device 100 in the first state 100a. Reference numeral 820b indicates an example in which an image of a second area 822 is displayed on the electronic device 100 in the second state 100b. In the electronic device 100, when the second housing 112 moves from the example indicated by reference numeral 820a in the −x direction with respect to the first housing 111, the exposed area of the flexible display 230 may be expanded in the +x direction to the example indicated by reference numeral 820b. With respect to the description made above with reference to FIG. 7, the first direction may be understood as the +x direction, and the second direction may be understood as the −x direction. According to an embodiment, the processor 220 may determine a first area 821 and a second area 822 in an image acquired through the camera 210 such that the center 823 of the first area 821 is located in the second direction (e.g., the −x direction) with respect to the center 824 of the second area 822.

Figure 9:
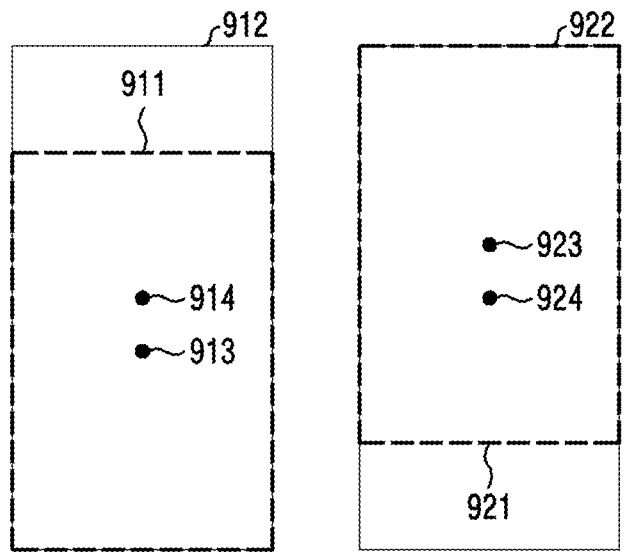
FIG. 9 illustrates examples of image areas displayed on the flexible display according to an expansion direction of the flexible display according to an embodiment.

FIG. 9 illustrates examples of image areas displayed on the flexible display 230 according to an expansion direction of the flexible display 230 according to an embodiment. FIG. 9 illustrates the case where the exposed area of the electronic device 100 is expanded to the upper side or expanded to the lower side.

According to an embodiment, when the second housing 112 of the electronic device 100 moves in the −y direction with respect to the first housing 111 and thus the exposed area of the flexible display 230 is expanded in the +y direction, with reference to the description made with reference to FIG. 7, it may be understood that the first direction is the +y direction and the second direction is the −y direction. The processor 220 may determine a first area 911 and a second area 912 in an image acquired through the camera 210 such that the center 913 of the first area 911 is located the −y direction with respect to the center 914 of the second area 912.

According to an embodiment, when the second housing 112 of the electronic device 100 moves in the +y direction with respect to the first housing 111 and thus the exposed area of the flexible display 230 is expanded in the −y direction, with reference to the description made with reference to FIG. 7, it may be understood that the first direction is the −y direction and the second direction is the +y direction. The processor 220 may determine a first area 921 and a second area 922 in an image acquired through the camera 210 such that the center 923 of the first area 921 is located in the +y direction with respect to the center 924 of the second area 922.

Figure 10:
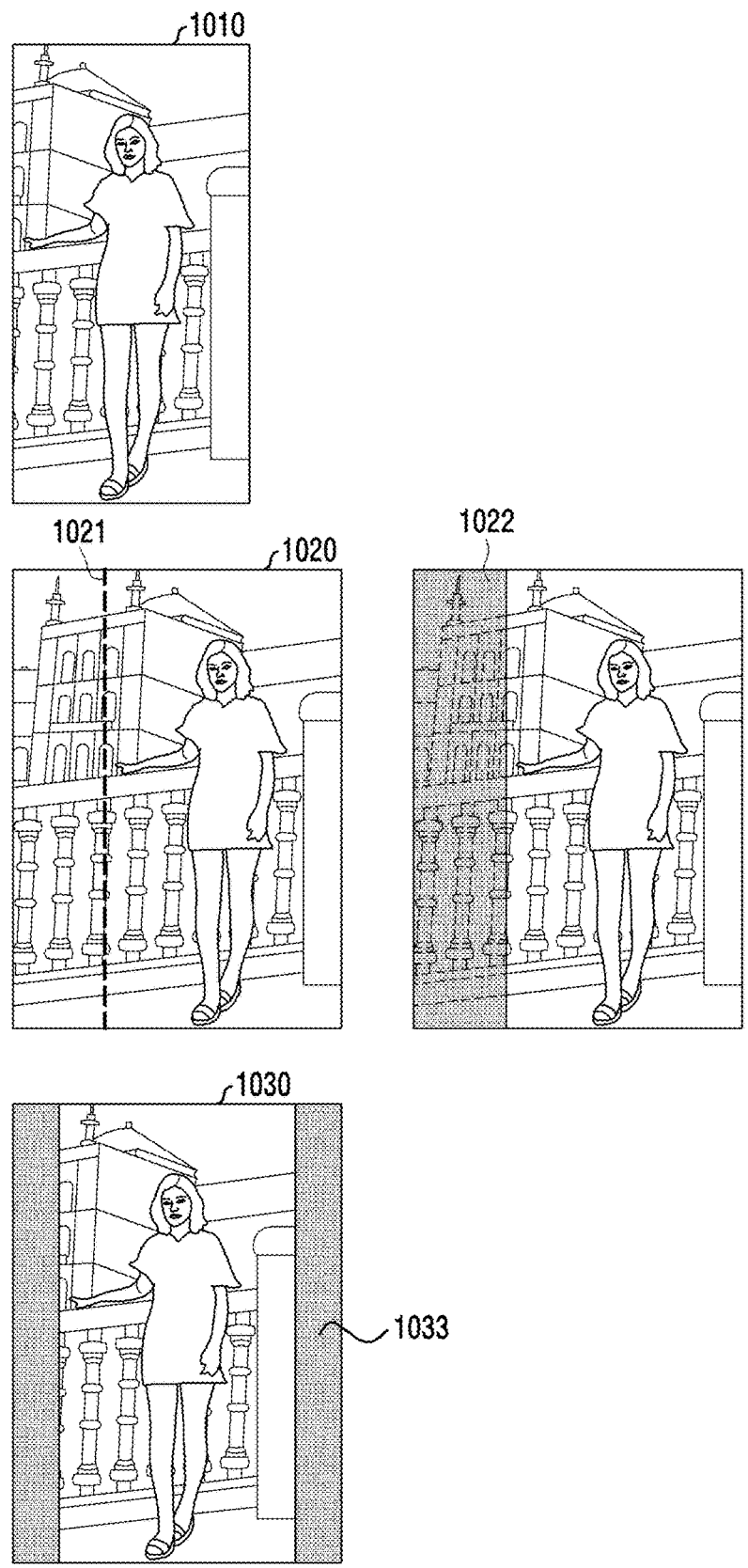
FIG. 10 illustrates examples of preview screens displayed on the flexible display when an image is acquired before and after the expansion of the flexible display according to an embodiment.

FIG. 10 illustrates examples of preview screens displayed on the flexible display 230 when an image is acquired before and after the expansion of the flexible display 230 according to an embodiment.

According to an embodiment, operation 301 illustrated in FIG. 3 and operation 701 illustrated in FIG. 7 may include an operation of acquiring an image through the camera 210 when the electronic device 100 is in the first state 100a or an operation of acquiring an image through the camera 210 when the electronic device 100 is in the second state 100b. Reference numeral 1010 indicates a preview image displayed on the flexible display 230 when an image is acquired through the camera 210 when the electronic device 100 is in the first state 100a, and reference numerals 1020 and 1030 illustrate preview images displayed on the flexible display 230 when an image is obtained through the camera 210 when the electronic device 100 is in the second state 100b.

According to an embodiment, reference numeral 1010 indicates an example of a screen displayed on the flexible display 230 as a preview of an image acquired through the camera 210 when the electronic device 100 is in the first state 100a.

According to an embodiment, when the electronic device 100 is in the first state 100a, the processor 220 may crop the image acquired through the camera 210 and may display the image of the first area on the exposed area of the flexible display 230.

According to an embodiment, reference numeral 1020 indicates an example of a screen displayed on the flexible display 230 as a preview of an image acquired through the camera 210 when the electronic device 100 is in the second state 100b.

According to an embodiment, when the electronic device 100 is in the second state 100b, the processor 220 may display the second area of the image acquired through the camera 210 on the exposed area of the flexible display 230. When displaying the image of the second area as a preview on the electronic device 100 in the second state 100*b*, the processor 220 may display an indicator that is capable of distinguishing an area not included in the first area in the image of the second area, on the exposed area of the flexible display 230 together with the image of the second area. The indicator may have various shapes. For example, the processor 220 may display the indicator in the form of a line 1021 at the boundary of the first area, or may display an area not corresponding to the first area in a shaded form 1022.

According to an embodiment, reference numeral 1030 indicates another example of a screen displayed on the flexible display 230 as a preview of an image acquired through the camera 210 when the electronic device 100 is in the second state 100*b*.

According to an embodiment, when the electronic device 100 is in the second state 100*b*, the processor 220 may display the first area of the image acquired through the camera 210 on the exposed area of the flexible display 230. Because the first area has a size corresponding to the exposed area of the first size, when the image of the first area is displayed on the exposed area having the second size, a letterbox 1033 may occur.

According to an embodiment, when the electronic device 100 acquires an image through the camera 210 in the second state 100*b*, the processor 220 may determine an area designated by the user as the first area. The processor 220 may determine the area designated by the user as a first area and display the first area on the exposed area of the flexible display 230 or may store the first area in the memory 250. When acquiring an image through the electronic device 100 in the second state 100*b*, the user may designate a first area in the preview screen displayed on the exposed area of the flexible display 230. For example, as in the example indicated by reference numeral 1020, the user may designate the position of the first area in the preview image of the second area displayed on the exposed area of the second size of the flexible display 230. As another example, as in the example indicated by reference numeral 1030, with respect to the preview image of the first area displayed on the exposed area of the flexible display 230, the user may designate or change the position of the first area. For example, the user may designate the first area through a drag or touch input.

Figure 11:
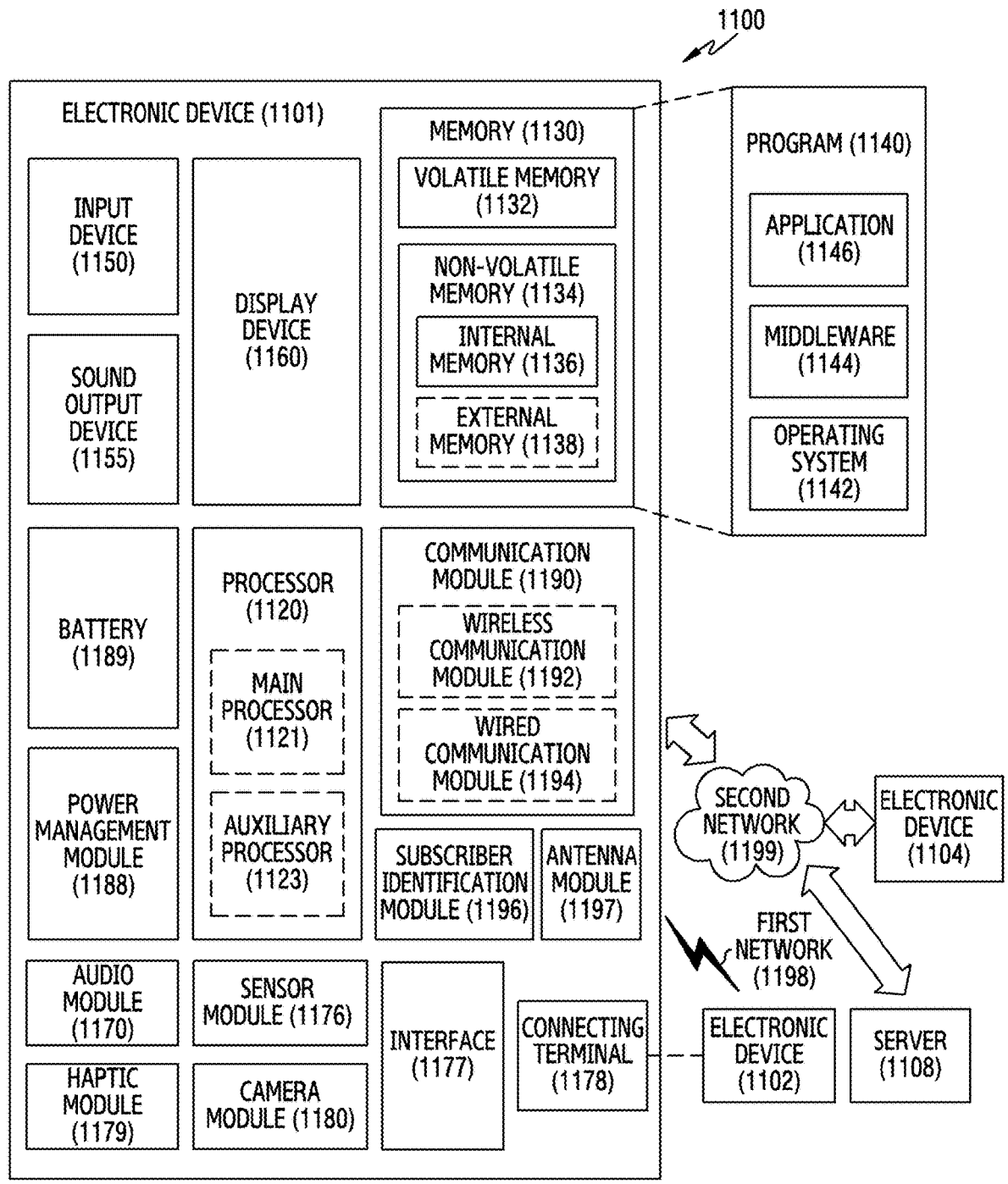
FIG. 11 illustrates a block diagram of an electronic device according to various embodiments in a network environment.

FIG. 11 illustrates a block diagram illustrating an electronic device 1101 in a network environment 1100 according to various embodiments. Referring to FIG. 11, the electronic device 1101 (e.g., the electronic device 100) in the network environment 1100 may communicate with an electronic device 1102 via a first network 1198 (e.g., a short-range wireless communication network), or at least one of an electronic device 1104 or a server 1108 via a second network 1199 (e.g., a long-range wireless communication network). According to an embodiment, the electronic device 1101 may communicate with the electronic device 1104 via the server 1108. According to an embodiment, the electronic device 1101 may include a processor 1120 (e.g., the processor 220), memory 1130 (e.g., the memory 250), an input module 1150, a sound output module 1155, a display module 1160 (e.g., the flexible display 230), an audio module 1170, a sensor module 1176 (e.g., the sensor 240), an interface 1177, a connecting terminal 1178, a haptic module 1179, a camera module 1180 (e.g., the camera 210), a power management module 1188, a battery 1189, a communication module 1190, a subscriber identification module (SIM) 1196, or an antenna module 1197. In some embodiments, at least one of the components (e.g., the connecting terminal 1178) may be omitted from the electronic device 1101, or one or more other components may be added in the electronic device 1101. In some embodiments, some of the components (e.g., the sensor module 1176, the camera module 1180, or the antenna module 1197) may be implemented as a single component (e.g., the display module 1160).

The processor 1120 may execute, for example, software (e.g., a program 1140) to control at least one other component (e.g., a hardware or software component) of the electronic device 1101 coupled with the processor 1120, and may perform various data processing or computation. According to one embodiment, as at least part of the data processing or computation, the processor 1120 may store a command or data received from another component (e.g., the sensor module 1176 or the communication module 1190) in volatile memory 1132, process the command or the data stored in the volatile memory 1132, and store resulting data in non-volatile memory 1134. According to an embodiment, the processor 1120 may include a main processor 1121 (e.g., a central processing unit (CPU) or an application processor (AP)), or an auxiliary processor 1123 (e.g., a graphics processing unit (GPU), a neural processing unit (NPU), an image signal processor (ISP), a sensor hub processor, or a communication processor (CP)) that is operable independently from, or in conjunction with, the main processor 1121. For example, when the electronic device 1101 includes the main processor 1121 and the auxiliary processor 1123, the auxiliary processor 1123 may be adapted to consume less power than the main processor 1121, or to be specific to a specified function. The auxiliary processor 1123 may be implemented as separate from, or as part of the main processor 1121.

The auxiliary processor 1123 may control at least some of functions or states related to at least one component (e.g., the display module 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active state (e.g., executing an application). According to an embodiment, the auxiliary processor 1123 (e.g., an image signal processor or a communication processor) may be implemented as part of another component (e.g., the camera module 1180 or the communication module 1190) functionally related to the auxiliary processor 1123. According to an embodiment, the auxiliary processor 1123 (e.g., the neural processing unit) may include a hardware structure specified for artificial intelligence model processing. An artificial intelligence model may be generated by machine learning. Such learning may be performed, e.g., by the electronic device 1101 where the artificial intelligence is performed or via a separate server (e.g., the server 1108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1130 may store various data used by at least one component (e.g., the processor 1120 or the sensor module 1176) of the electronic device 1101. The various data may include, for example, software (e.g., the program 1140) and input data or output data for a command related thereto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input module 1150 may receive a command or data to be used by another component (e.g., the processor 1120) of the electronic device 1101, from the outside (e.g., a user) of the electronic device 1101. The input module 1150 may include, for example, a microphone, a mouse, a keyboard, a key (e.g., a button), or a digital pen (e.g., a stylus pen).

The sound output module 1155 may output sound signals to the outside of the electronic device 1101. The sound output module 1155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1160 may visually provide information to the outside (e.g., a user) of the electronic device 1101. The display module 1160 may include, for example, a display, a hologram device, or a projector and control circuitry to control a corresponding one of the display, hologram device, and projector. According to an embodiment, the display module 1160 may include a touch sensor adapted to detect a touch, or a pressure sensor adapted to measure the intensity of force incurred by the touch.

The audio module 1170 may convert a sound into an electrical signal and vice versa. According to an embodiment, the audio module 1170 may obtain the sound via the input module 1150, or output the sound via the sound output module 1155 or a headphone of an external electronic device (e.g., an electronic device 1102) directly (e.g., wiredly) or wirelessly coupled with the electronic device 1101.

The sensor module 1176 may detect an operational state (e.g., power or temperature) of the electronic device 1101 or an environmental state (e.g., a state of a user) external to the electronic device 1101, and then generate an electrical signal or data value corresponding to the detected state. According to an embodiment, the sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device (e.g., the electronic device 1102) directly (e.g., wiredly) or wirelessly. According to an embodiment, the interface 1177 may include, for example, a high definition multimedia interface (HDMI), a universal serial bus (USB) interface, a secure digital (SD) card interface, or an audio interface.

A connecting terminal 1178 may include a connector via which the electronic device 1101 may be physically connected with the external electronic device (e.g., the electronic device 1102). According to an embodiment, the connecting terminal 1178 may include, for example, a HDMI connector, a USB connector, a SD card connector, or an audio connector (e.g., a headphone connector).

The haptic module 1179 may convert an electrical signal into a mechanical stimulus (e.g., a vibration or a movement) or electrical stimulus which may be recognized by a user via his tactile sensation or kinesthetic sensation. According to an embodiment, the haptic module 1179 may include, for example, a motor, a piezoelectric element, or an electric stimulator.

The camera module 1180 may capture a still image or moving images. According to an embodiment, the camera module 1180 may include one or more lenses, image sensors, image signal processors, or flashes.

The power management module 1188 may manage power supplied to the electronic device 1101. According to one embodiment, the power management module 1188 may be implemented as at least part of, for example, a power management integrated circuit (PMIC).

The battery 1189 may supply power to at least one component of the electronic device 1101. According to an embodiment, the battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104, or the server 1108) and performing communication via the established communication channel. The communication module 1190 may include one or more communication processors that are operable independently from the processor 1120 (e.g., the application processor (AP)) and supports a direct (e.g., wired) communication or a wireless communication. According to an embodiment, the communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of these communication modules may communicate with the external electronic device via the first network 1198 (e.g., a short-range communication network, such as BLUETOOTH, wireless-fidelity (Wi-Fi) direct, or infrared data association (IrDA)) or the second network 1199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1192 may identify and authenticate the electronic device 1101 in a communication network, such as the first network 1198 or the second network 1199, using subscriber information (e.g., international mobile subscriber identity (IMSI)) stored in the subscriber identification module 1196.

The wireless communication module 1192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1192 may support a high-frequency band (e.g., the mmWave band) to achieve, e.g., a high data transmission rate. The wireless communication module 1192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1192 may support various requirements specified in the electronic device 1101, an external electronic device (e.g., the electronic device 1104), or a network system (e.g., the second network 1199). According to an embodiment, the wireless communication module 1192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1197 may transmit or receive a signal or power to or from the outside (e.g., the external electronic device) of the electronic device 1101. According to an embodiment, the antenna module 1197 may include an antenna including a radiating element composed of a conductive material or a conductive pattern formed in or on a substrate (e.g., a printed circuit board (PCB)). According to an embodiment, the antenna module 1197 may include a plurality of antennas (e.g., array antennas). In such a case, at least one antenna appropriate for a communication scheme used in the communication network, such as the first network 1198 or the second network 1199, may be selected, for example, by the communication module 1190 (e.g., the wireless communication module 1192) from the plurality of antennas. The signal or the power may then be transmitted or received between the communication module 1190 and the external electronic device via the selected at least one antenna. According to an embodiment, another component (e.g., a radio frequency integrated circuit (RFIC)) other than the radiating element may be additionally formed as part of the antenna module 1197.

According to various embodiments, the antenna module 1197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1101 and the external electronic device 1104 via the server 1108 coupled with the second network 1199. Each of the electronic devices 1102 or 1104 may be a device of a same type as, or a different type, from the electronic device 1101. According to an embodiment, all or some of operations to be executed at the electronic device 1101 may be executed at one or more of the external electronic devices 1102, 1104, or 1108. For example, if the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least part of a reply to the request. To that end, a cloud computing, distributed computing, mobile edge computing (MEC), or client-server computing technology may be used, for example. The electronic device 1101 may provide ultralow-latency services using, e.g., distributed computing or mobile edge computing. In another embodiment, the external electronic device 1104 may include an internet-of-things (IoT) device. The server 1108 may be an intelligent server using machine learning and/or a neural network. According to an embodiment, the external electronic device 1104 or the server 1108 may be included in the second network 1199. The electronic device 1101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1140) including one or more instructions that are stored in a storage medium (e.g., internal memory 1136 or external memory 1138) that is readable by a machine (e.g., the electronic device 1101). For example, a processor (e.g., the processor 1120) of the machine (e.g., the electronic device 1101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

An electronic device 100 according to an embodiment of the disclosure may include: a housing 110 including a first housing 111 and a second housing 112 coupled to the first housing 111 to be movable with respect to the first housing 111; a flexible display 230 including an exposed area visible to the outside of the electronic device 100 through the front surface of the electronic device 100, wherein the exposed area has a first size when the electronic device 100 is in a first state 100a and a second size larger than the first size when the second housing 112 moves and the electronic device 100 is switched into a second state 100b; a camera 210 exposed through an area of the housing 110; and at least one processor 220 disposed in the housing 110 and electrically connected to the flexible display 230 and the camera 210. The at least one processor 220 may be configured to: acquire an image having a designated aspect ratio through the camera 210; display the first area of the image on the exposed area of the flexible display 230 so as to correspond to the first size when the electronic device 100 is in the first state 100a; and display the second area of the image larger than the first area on the exposed area of the flexible display 230 so as to correspond to the second size when the electronic device 100 is in the second state 100b.

In the electronic device 100 according to an embodiment of the disclosure, the second area of the image may include the first area.

The electronic device 100 according to an embodiment of the disclosure may include a memory 250 disposed in the housing 110 and electrically connected to the at least one processor 220. The at least one processor 220 may be configured to store each of the first area and the second area of the image in the memory 250 in response to a user's imaging command.

The electronic device 100 according to an embodiment of the disclosure may include a memory 250 disposed in the housing 110 and electrically connected to the at least one processor 220. The at least one processor 220 may be configured to: store the second area of the image in the memory 250 in response to a user's imaging command; and acquire the first area by cropping a portion of the stored second area and display the first area obtained thereby on the exposed area of the flexible display 230 when the electronic device 100 is in the first state 100a.

The electronic device 100 according to an embodiment of the disclosure may include a memory 250 disposed in the housing 110 and electrically connected to the at least one processor 220. The at least one processor 220 may be configured to: store the first area of the image and an area other than the first image in the second area in the memory 250 in response to the user's imaging command; and merge the stored first area and the area other than the first area in the second area and display the area obtained thereby on the exposed area of the flexible display 230 when the electronic device 100 is in the second state 100b.

In the electronic device 100 according to an embodiment of the disclosure, the exposed area may have a third size that is larger than the first size and smaller than the second size when the electronic device 100 is in a third state between the first state 100a and the second state 100b. The at least one processor 220 may be configured to display a third area of the image that is larger than the first area and smaller than the second area on the exposed area of the flexible display 230 so as to correspond to the third size when the electronic device 100 is in the third state.

In the electronic device 100 according to an embodiment of the disclosure, the at least one processor 220 may be configured to: determine the first area and the second area when the second housing 112 moves with respect to the first housing 111 and thus the exposed area of the flexible display 230 is expanded in a first direction such that the center of the first area of the image is located in a second direction opposite to the first direction with respect to the center of the second area.

In the electronic device 100 according to an embodiment of the disclosure, the designated aspect ratio may correspond to an increased resolution that is capable of being acquired through the camera 210.

According to an embodiment of the disclosure, a method of operating an electronic device 100, in which an exposed area of a flexible display 230 exposed to the outside of the electronic device 100 may have a first size or a second size larger than the first size, may include: an operation of acquiring an image having a designated aspect ratio using a camera 210 of the electronic device 100; an operation of displaying, by a processor 220 of the electronic device 100, the first area of the image on the exposed area of the flexible display 230 so as to correspond to the first size when the size of the exposed area is the first size; and an operation of displaying, by the processor 220, a second area of the image larger than the first area on the exposed area of the flexible display 230 so as to correspond to the second size when the size of the exposed area is the second size.

In the method of operating the electronic device 100 according to an embodiment of the disclosure, the second area of the image may include the first area.

The method of operating the electronic device 100 according to an embodiment of the disclosure may include an operation of storing, in a memory 250 included in the electronic device 100, each of the first area and the second area of the image acquired through the camera 210 in response to a user's imaging command.

The method of operating the electronic device 100 according to an embodiment of the disclosure further include: an operation of storing, in the memory 250 included in the electronic device 100, the second area of the image acquired through the camera 210 in response to a user's imaging command; and an operation of cropping, by the processor, a portion of the stored second area when the size of the exposed area is the first size and displaying the first area on the exposed area of the flexible display 230.

The method of operating the electronic device 100 according to an embodiment of the disclosure may further include: an operation of storing, in the memory 250 included in the electronic device 100, the first area of the image acquired through the camera 210 in response to the user's imaging command and an area other than the first area in the second area; and an operation of merging the stored first area and the area other than the first area in the second area when the size of the exposed area is the second size and displaying an image obtained thereby on the exposed area of the flexible display 230.

The method of operating the electronic device 100 according to an embodiment of the disclosure may include, when the size of the exposed area is a third size larger than the first size and smaller than the second size, an operation of displaying, by the processor 220, a third area of the image that is larger than the first area and smaller than the second area on the exposed area of the flexible display 230 so as to correspond to the third size.

The method of operating the electronic device 100 according to an embodiment of the disclosure may include an operation of determining, by the processor 220, the first area and the second area when the flexible display 230 is expanded and thus the exposed area is expanded in a first direction such that the center of the first area of the image is located in a second direction opposite to the first direction with respect to the center of the second area.

An electronic device 100 according to an embodiment of the disclosure may include: a flexible display 230 including an exposed area visible to the outside of the electronic device 100 through the front surface of the electronic device 100, wherein the exposed area has a first size when the electronic device 100 is in a first state 100a and a second size larger than the first size when the electronic device 100 is in a second state 100b; a camera 210; and at least one processor 220 electrically connected to the flexible display 230 and the camera 210. The at least one processor may be configured to: acquire an image having a designated aspect ratio through the camera 210; display a first area of the image on the exposed area of the flexible display 230 so as to correspond to the first size when the electronic device 100 is in the first state 100a; and display a second area of the image including the first area on the exposed area of the flexible display 230 to correspond to the second size when the electronic device 10 is in the second state 100b.

In the electronic device 100 according to an embodiment of the disclosure, the at least one processor 220 may be configured to: display the first area of the image on the exposed area of the flexible display 230 as a preview when the image is acquired through the camera 210 when the electronic device 100 is in the first state 100a; and display the second area of the image on the exposed area of the flexible display 230 as a preview when the image is acquired through the camera 210 when the electronic device 100 is in the second state 100b.

In the electronic device 100 according to an embodiment of the disclosure, the at least one processor 220 may be configured to crop the image and display the first area on the exposed area of the flexible display 230 when the electronic device 100 is in the first state 100a.

In the electronic device 100 according to an embodiment of the disclosure, the at least one processor 220 may be configured to display, on the exposed area of the flexible display 230, an indicator capable of distinguishing an area that is not included in the first area in the second area when the electronic device 100 is in the second state 100b.

In the electronic device 100 according to an embodiment of the disclosure, the at least one processor 220 may be configured to display the first area of the image on the exposed area of the flexible display 230 when the electronic device 100 is in the second state 100b.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a housing including a first housing and a second housing coupled to the first housing to be movable with respect to the first housing;
a memory disposed in the housing, wherein the memory is a non-volatile memory;
a flexible display including an exposed area visible to an outside of the electronic device through a front surface of the electronic device, wherein the exposed area includes a first size when the electronic device is in a first state, a second size larger than the first size when the second housing moves and the electronic device is switched into a second state, and a third size that is larger than the first size and smaller than the second size when the electronic device is in a third state between the first state and the second state;
a camera exposed through an area of the housing; and
at least one processor disposed in the housing and electrically connected to the memory, the flexible display, and the camera,
wherein the at least one processor is configured to:
acquire an image including a designated aspect ratio through the camera;
in response to receiving an imaging command from a user, store in the memory each of a first area of the image corresponding to the first size of the exposed area and a second area of the image corresponding to the second size of the exposed area, and a third area of the image corresponding to the third size of the exposed area;

when the electronic device is in the first state, display the first area of the image stored in the memory on the exposed area of the flexible display;

when the electronic device is in the second state, display the second area of the image stored in the memory on the exposed area of the flexible display; and when the electronic device is in the third state, display the third area of the image stored in the memory on the exposed area of the flexible display.

2. The electronic device of claim 1, wherein the second area of the image includes the first area of the image.

3. The electronic device of claim 1, wherein the at least one processor is further configured to:

acquire the second area of the image in response to receiving the imaging command;

acquire the first area of the image by cropping a portion of the second area of the image; and store the first area of the image and the second area of the image in the memory.

4. The electronic device of claim 1, wherein:

the third area of the image is included in the second area of the image, and the third area of the image includes the first area of the image.

5. The electronic device of claim 1, wherein the at least one processor is further configured to:

determine the first area of the image and the second area of the image when the second housing moves with respect to the first housing and thus the exposed area of the flexible display is expanded in a first direction such that a center of the first area of the image is located in a second direction opposite to the first direction with respect to a center of the second area of the image.

6. The electronic device of claim 5, wherein:

the flexible display includes a first portion coupled to the second housing, and a second portion extending in the first direction with respect to the first portion and retractable into the electronic device, and the at least one processor is further configured to:

display the first area of the image on the first portion of the flexible display, and display an area of the image other than the first area in the second area of the image on the second portion of the flexible display.

7. The electronic device of claim 1, wherein the designated aspect ratio corresponds to an increased resolution that is capable of being obtained through the camera.

8. A method of operating an electronic device including an exposed area of a flexible display that is exposed to an outside of the electronic device and includes a first size or a second size larger than the first size, or a third size larger than the first size and smaller than the second size, the method comprising:

acquiring an image including a designated aspect ratio using a camera of the electronic device;

in response to receiving an imaging command from a user, storing in a memory included in the electronic device each of a first area of the image corresponding to the first size of the exposed area and a second area of the image corresponding to the second size of the exposed area, and a third area of the image corresponding to the third size of the exposed area, wherein the memory is a non-volatile memory;

when the exposed area is the first size, displaying the first area of the image stored in the memory on the exposed area of the flexible display;

when the exposed area is the second size, displaying the second area of the image stored in the memory on the exposed area of the flexible display; and when the exposed area is the third size, displaying the third area of the image stored in the memory on the exposed area of the flexible display.

9. The method of claim 8, wherein the second area of the image includes the first area of the image.

10. The method of claim 8, wherein storing the first area the second area, and the third area of the image in the memory comprises:

acquiring the second area of the image in response to receiving the imaging command;

acquiring the first area of the image by cropping a portion of the second area of the image; and storing the first area of the image and the second area of the image in the memory.

11. The method of claim 8, wherein:

the third area of the image is included in the second area of the image, and the third area of the image includes the first area of the image.

12. The method of claim 8, further comprising:

determining the first area of the image and the second area of the image when the flexible display is expanded and thus the exposed area is expanded in a first direction such that a center of the first area of the image is located in a second direction opposite to the first direction with respect to a center of the second area of the image.

13. The method of claim 8, wherein the designated aspect ratio corresponds to an increased resolution that is capable of being obtained through the camera.

* * * * *